United States Patent [19]
Gillette et al.

[11] 3,895,685
[45] July 22, 1975

[54] METHOD AND APPARATUS FOR ULTRASONIC INSPECTION OF WELDMENTS

[75] Inventors: Carl L. Gillette, Chattanooga; William M. Ramey, Hixson, both of Tenn.

[73] Assignee: Combustion Engineering, Inc., Windsor, Conn.

[22] Filed: Apr. 19, 1971

[21] Appl. No.: 134,999

[52] U.S. Cl. .................. 181/.5; 73/67.8 S; 73/561
[51] Int. Cl. ............................................. G01n 9/24
[58] Field of Search ....... 181/.5 NP, .5 AP; 73/67.1, 73/67.8 S, 522–561, 67.3

[56] References Cited
UNITED STATES PATENTS

| | | | |
|---|---|---|---|
| 3,280,621 | 10/1966 | Cardinal et al. | 73/67.8 S |
| 3,313,146 | 4/1967 | Krautkramer | 73/67.8 S |
| 3,326,037 | 6/1967 | Stewart | 73/67.8 S |
| 3,350,925 | 11/1967 | Coy | 73/67.8 S |

OTHER PUBLICATIONS

Cross, Hannah, Tooley, Birks, "Delta Technique Extends the Capabilities of Weld Quality Assurance," The British Journal of Non-Destructive Testing, Vol. 11, No. 4, 1970.

*Primary Examiner*—Maynard R. Wilbur
*Assistant Examiner*—N. Moskowitz

[57] ABSTRACT

Ultrasonic inspection apparatus and method for detecting discontinuities in thick section zones of interest, such as weldments. Ultrasonic energy is beamed at and accoustically coupled to the surface of a material having a weldment therein. The angle of incidence of the beam with the surface is controlled to provide in the material a refracted beam of ultrasonic energy in the longitudinal wave mode at an angle and in a direction which intersect the weld at an oblique angle relative to the surface at the weld. An ultrasonic receiving transducer positioned over the weld senses ultrasonic energy redirected by any discontinuity in the weld.

25 Claims, 6 Drawing Figures

INVENTORS
CARL L. GILLETTE
WILLIAM M. RAMEY
BY
Stephen A. Schnoeberger
ATTORNEY

METHOD AND APPARATUS FOR ULTRASONIC INSPECTION OF WELDMENTS

BACKGROUND OF THE INVENTION

The invention relates generally to non-destructive testing. More particularly the invention relates to the use of ultrasonics for performing non-destructive inspections of solid materials. More particularly still, the invention relates to a method of and apparatus for ultrasonically inspecting areas of interest, such as weldments, in thick or heavy section materials for discontinuities therein.

The use of ultrasonic energy to test materials for the presence of flaws of discontinuities is well known. Such methods usually rely upon an ultrasonic transducer, such as a piezoelectric crystal, to direct ultrasonic energy at an area of interest and employ a variety of techniques for sensing and analyzing the effects of a discontinuity on the impinging ultrasonic energy.

The ultrasonic energy directed at the area under inspection may either be a continuous wave at ultrasonic frequencies or it may be in the form of discrete pulses. Generally speaking, inspection techniques which transmit a continuous wave of ultrasonic energy use separate transmitting and receiving probes or transducers and usually indicate the existence of a discontinuity by a reduction in the intensity of the ultrasonic energy received at the receiving transducer. Systems employing pulsed ultrasonic energy may be operated in a variety of ways; the most frequently used is "pulse-echo." In the pulse-echo method of examination, the transducer directs ultrasound pulses at the area of interest and serves as a receiver for ultrasound reflected or echoed from the material boundaries and internal discontinuities back toward the transducer. Another inspection technique which employs pulses of ultrasonic energy is that of transmit-receive operation. Transmit-receive operation employs separate transmitting and receiving transducers. Pulsed ultrasonic energy directed at the area of interest by the transmitter is redirected by the material boundaries and any discontinuities and sensed by the separate receiver. The several techniques using pulsed ultrasonic energy rely upon the time of travel, the angle of reflection and/or the angle of refraction of the pulses to both indicate the presence of discontinuities and to establish their location within the material.

Two modes of ultrasonic wave propagation, longitudinal and transverse, find most common usuage in ultrasonic inspection. When the motion of particles in a medium is induced parallel to the direction of wave propagation, longitudinal waves are produced, the wave fronts progressing as an ultrasonic series of compressions and rarefactions. Such a longitudinal wave will travel in liquids, solids, or gases, at a velocity dependent on the physical properties of the particular material. With the transverse or sheer wave, the movement of particles in the medium is at right angles to the direction of wave propagation. Transverse waves cannot be propagated in liquids or gases but only in solids. Also, transverse waves have a velocity that is approximately half that of longitudinal waves of the same frequency and in the same medium.

The particular technique of inspection employed in any instance will be dictated by such factors as the type and thickness of the material under inspection, the operating environment, and the expected types and orientations of discontinuities in the material under inspection. For materials having a substantial thickness, transmission of continuous waves through the thickness or pulse echo techniques employing a longitudinal wave directed normal to the surface of the material under inspection have been used. The longitudinal wave is particularly effective for thick or heavy section penetration, since the longitudinal wave beam may be focussed more sharply than a transverse wave of the same frequency, and is less subject to scattering due to small inclusions in the material. However, such a beam of energy normal to the surface will have difficulty detecting discontinuities oriented parallel to the beam. In order to overcome the problem created by this type of discontinuity orientation, ultrasonic inspection systems have used pulse echo and transmit-receive techniques wherein transverse waves are propagated in the solid material under inspection. These transverse waves are directed obliquely at the zone of interest by refraction of the incident beam. This technique has been particularly satisfactory in detecting flaws which are randomly oriented in the material under inspection and has found particular applicability in the inspection of piping and other tubular materials. This latter mentioned technique intentionally propagates only transverse waves in the material under inspection in order to prevent any confusion which might arise with the presence of both transverse waves and longitudinal waves. The use of angled transverse waves has its shortcomings, however, because such inspection is generally limited to materials having relatively thin cross sections, as for instance less than several inches.

Some applications for ultrasonic inspection require accurate examination of materials having thicknesses as great as 8 to 12 inches or more. One such example is illustrated by the need to accurately inspect the weld seams in and between plates, forgings and/or other product forms, such as are used in heavy walled pressure vessels. The plates used in such vessels are often heavy sections eight to twelve inches thick and require weldments having the same thickness. Prior art normal beam pulse echo and continuous wave through-the-thickness ultrasonic inspection techniques, while usually providing the necessary penetration, are less than satisfactory for the reason that discontinuities occurring in this type of weldment, both at the time the weld is made and following subsequent stressing tend to be at the interface between the base material of the section and the weld and may be oriented normal to the surface of the section, parallel to an ultrasonic beam normal to said surface. The various systems using angled pulsed transverse waves for inspection of weld seams are not generally adversely affected by the orientation of the discontinuities usually incurred in weldments and are quite adequate for performing inspection of materials having section thicknesses less than several inches. However, the beam of transverse ultrasonic waves is rapidly attenuated over relatively short distances and further, is required in some instances to travel distances which are several times the thickness of the material containing a weld under inspection before being received.

SUMMARY OF THE INVENTION

According to the invention a method of and means for ultrasonically inspecting a zone of interest, such as a weld seam, in thick or heavy section materials are provided. A multiple transducer, transmit-receive inspection technique is employed. Though a continuous wave ultrasonic beam might be used in certain limited instances, pulsed energy is preferred for its ability to provide a time reference. A beam of pulsed ultrasonic energy is angularly directed at the surface of the material. Upon entering the material the ultrasonic energy is refracted to another angle. This refracted angle is controlled to maintain a longitudinal wave mode of beam propagation within the material in the direction desired. This beam of energy in the longitudinal wave mode is directed to be incident with and intersect the zone of interest. As the refracted longitudinal wave contacts a discontinuity, its energy is redirected in several manners. Some energy is reflected, some is converted into transverse waves, and still other is reradiated omnidirectionally by the discontinuity. A receiving transducer is positioned over and oriented normal to the surface of the material or weld seam to receive that energy redirected toward it. If a weld seam is the zone of interest, the receiving transducer is positioned over the surface at the weld seam to receive that redirected ultrasonic energy which exits from the surface at the weld seam and substantially normal thereto. Appropriately programmed and calibrated receiver electronics display and/or record the redirected energy sensed by the receiving transducer as an indication of the presence of a discontinuity. The energy transit time from a predetermined location to the discontinuity and from the discontinuity to another predetermined location serves to locate the discontinuity.

It has been found that such angled longitudinal waves convey significantly more acoustical energy a greater distance than do transverse waves. Further, because the beam of longitudinal waves within the material impinges on the zone of interest, i.e., weld seam, at an angle which is oblique to both the surface of the material and the through-the-thickness dimension of the zone of interest, discontinuities of substantially all orientations which are likely to exist in a weldment are contacted by the beam. Because the diameter of the beam is usually less than the through-the-thickness dimension, or depth, of a weldment it may be necessary to scan the refracted longitudinal wave along this dimension of the weld. This may be accomplished in several ways.

A preferred method for scanning the through-the-thickness dimension of the weldment is accomplished by maintaining the transmitted longitudinal wave at a constant angle of incidence and accordingly a constant angle of refraction and moving the transmitter toward and away from the weld seam in a path which parallels the surface of the material containing the weld seam. A modification of this technique is obtained by using a plurality of ultrasonic transmitters in the line of the to and fro motion and sequentially pulsing the transmitters to effect the scanning action. Still another scanning technique is obtained by moving the ultrasonic transmitter only angularly to vary the incident and refracted angles of the longitudinal wave thereby effecting a through-the-thickness scan of the weld.

The preferred method of scanning the weldment is further enhanced with the use of two ultrasonic transmitters rather than one with both moving in paths parallel to the surface of the material, but with one operating to one side of the receiving transducer and weld seam and the other operating to the other side. This arrangement simultaneously scans the weld seam from both sides, as is generally desired for such inspections. Further, this dual transmitter arrangement is capable of accurately establishing the across-the-width location of a discontinuity in the weld seam.

In one embodiment of the invention a preliminary examination of the base material adjacent to the weld seam is made prior to the inspection of the weld itself. Such examination determines the presence of any discontinuities in the base material which might interfere with the angled longitudinal wave beam prior to its contacting the weld seam under inspection. This preliminary examination would be conducted with the first inspection of the weld and would not generally be necessary thereafter. Such preliminary examination is accomplished using a normal beam pulse echo technique which employs the same transducer for both the transmitting and receiving operations.

While the invention probably has greatest application in the inspection of weld seams, it should be realized that its applicability includes inspection of diverse forms of weldments and also zones of interest within thick section materials which are not weldments but rather portions of the material itself.

DESCRIPTION OF THE PREFERRED EMBODIMENT

Figure 1:
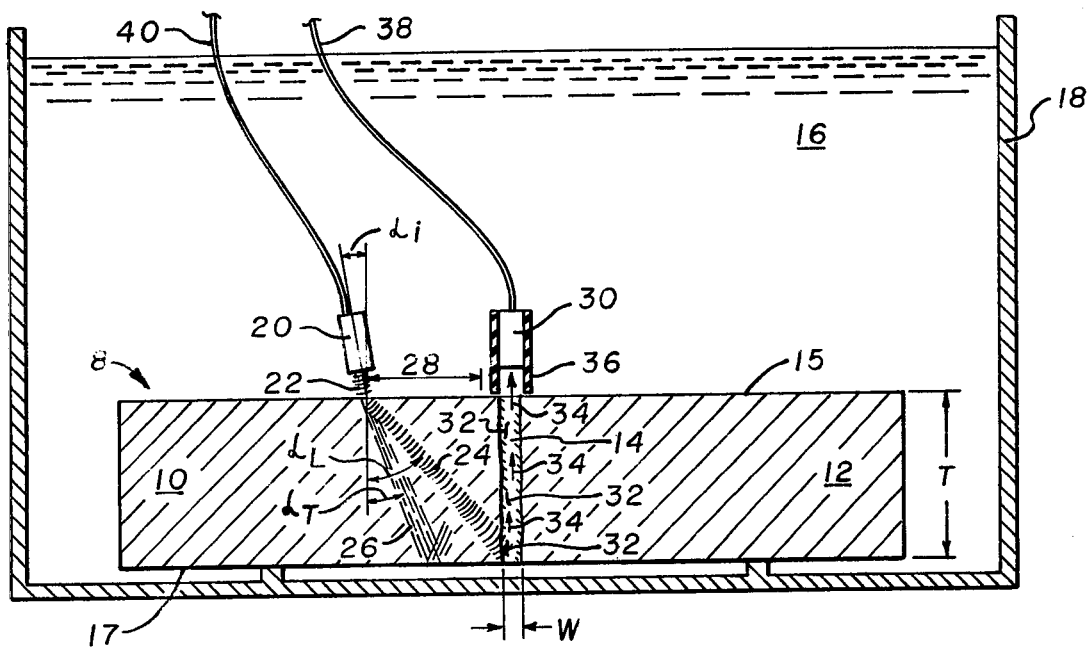
FIG. 1 is a sectional view through-the-thickness of a material having a weldment therein showing a basic form of apparatus for practicing the weld inspection method of the invention.

In the several FIGURES, like elements are given like numbers. FIG. 1 depicts a basic form of the invention. A section of material 8 as used in pressure vessels is comprised of thick or heavy section steel plates 10 and 12 joined by through-the-thickness butt weld 14. FIG. 1 is a through-the-thickness view of material section 8 and weld seam 14. Material section 8 has a thickness, T, which is equal to that of plates 10 and 12 and weldment 14 has a depth which, in this instance, extends entirely through-the-thickness of material section 8 from surface 15 thereof to surface 17 thereof. Thickness, T, of section 8 may range from several inches to more than 12 inches depending upon the stresses anticipated. The width, W, of weldment 14 will vary with the thickness of the section, a typical width being somewhat greater than 1 inch for a section thickness of 10 inches. Further the weldment 14 will usually be an elongated weld seam having a length, L, in a direction normal to the plane of FIG. 1. Weld 14 may be made in a variety of ways, for instance by multiple pass are welding in which the weld metal is deposited for fusion with plates 10 and 12.

For ease of explanation, section 8 containing the weld seam 14 to be inspected is shown submerged in an acoustical couplant, such as water 16, contained in tank 18. If the inspection is to comprise part of the manufacturing stage or in-service inspection programs for a pressure vessel, the steel plates would form part of a cylindrical pressure vessel, the weld seams would extend axially and circumferentially of the vessel and water flooding the vessel would provide the necessary acoustical coupling for the ultrasonic inspection performed preferably from within the vessel.

A source of ultrasonic pulses, transmitting transducer 20, directs a beam 22 of ultrasonic pulses at surface 15 of section 8 in the direction of weld 14. While transducer 20 might be in direct contact with plate 10 or might be acoustically coupled therewith by a solid medium such as Perspex, a more flexible arrangement is obtained where transducer 20 is spaced a small distance from the specimen being examined. According to the invention, it is necessary that the ultrasonic energy used to scan the zone of interest be in the longitudinal wave mode. Use of angled longitudinal waves to scan the weld has resulted in significantly greater intensities of ultrasonic energy being redirected by discontinuities and available for sensing by a receiving transducer than has been the case when using ultrasonic energy in the transverse wave mode. Because fluids will not support transverse waves, beam 22 is comprised of longitudinal waves. When a beam of ultrasonic waves is obliquely incident on a surface or interface between one medium and another, some of the energy is reflected and the remainder is transmitted into the second medium and refracted to an angle determined by the speed of sound in the media involved. Also, through the phenomenon known as mode conversion, the incident ultrasonic beam may be converted into another mode of vibration or wave motion when reflection by or transmission into the second medium occurs. Accordingly some of the energy from beam 22 is reflected from surface 15 of section 8 but the remainder enters plate 10 and is both refracted and undergoes mode conversion. The incident angle of beam 22 with section 8 is measured from the normal and is indicated as $\alpha_i$. Where beam 22 is being transmitted through a water couplant and into a steel medium, the angle of refraction of longitudinal wave 24 in steel is $\alpha_L$ and the angle of the transverse wave 26 created by mode conversion is $\alpha_T$. In accordance with Snell's Law, $\alpha_L$ and $\alpha_T$ are determined from the relationships:

$$\sin \alpha_L = \frac{C_2}{C_1} \sin \alpha_i$$

and $$\sin \alpha_T = \frac{C_2}{C_1} \sin \alpha_i$$

where $C_1$ is the velocity of the incident sound wave in the first medium and $C_2$ is the velocity of the sound wave in question, longitudinal or transverse, in the second medium.

Generally speaking, the velocity of a transverse wave in a given medium is about one-half that of a longitudinal wave in the same medium. In the embodiment of FIG. 1 the velocity of longitudinal wave beam 22 in water is $0.6 \times 10^5$ in./sec., the velocity of longitudinal wave 24 in steel is $2.41 \times 10^5$ in./sec., and the velocity of transverse wave 26 in steel is $1.29 \times 10^5$ in./sec. It will be noted that when the angle of incidence $\alpha_i$ exceeds a certain value, in this instance 14.5°, longitudinal wave 24 will no longer exist in the steel plate. Therefore it is necessary to maintain $\alpha_i$ at less than 14.5° for the water-steel combination. The critical angle at which the refracted longitudinal wave beam 14 disappears will vary depending on the media involved.

The discontinuities most deleterious to the integrity of a weld 14 are generally those oriented normal to the surface and it is, therefore, desirable that longitudinal wave beam 24 obliquely contact the area of interest, weld 14. Stated another way, it is desirable that longitudinal wave beam 24 be incident with the area of interest at an oblique angle to a line normal to the surface of the plates and passing through the area of interest. This ensures that discontinuities oriented either normal or parallel to the surface of the plates and weldment will be contacted by beam 24. A refracted beam angle $\alpha_L$ of about 45° will result in beam 24 intersecting weld 14 at an angle of about 45° to a line extending through the weld and normal to surface 15. This would differ somewhat if the surface 15 of section 8 is not planar as shown in FIG. 1, but rather is curved as might be the case if it formed part of the wall of a cylindrical vessel. If the coupling medium between transducer 20 and steel plate 10 is water, $\alpha_L$ will typically be between 40° and 50° for $\alpha_i$ between 9° and 11°. If the coupling medium is a plastic such as Lucite, $\alpha_L$ will be between 40° and 50° for $\alpha_i$ between 18° and 21°.

Figure 5:
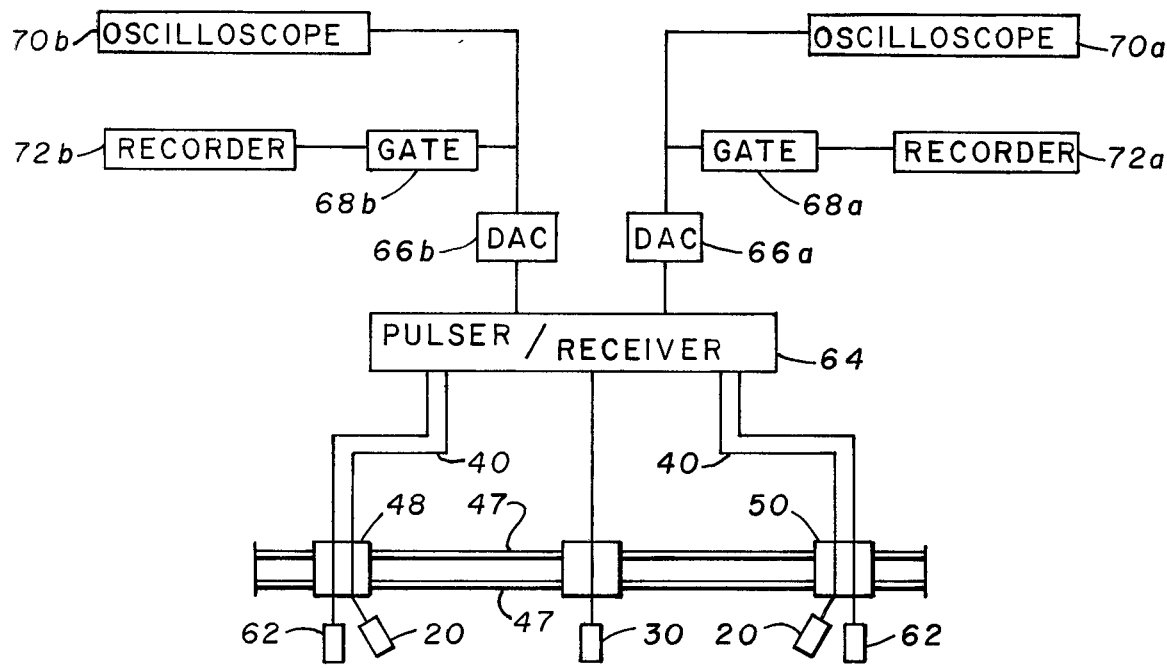
FIG. 5 is a simplified schematic block diagram of the electronic circuitry utilized to generate ultrasonic pulses, and to process and display received ultrasonic signals.

The cross sectional area of beam 24 at weld 14 will normally be such that it intersects only a small part of the weld and accordingly, only those discontinuities contacted by the beam will result in any redirection of the beam's ultrasonic energy to a receiver. In order to inspect the entire depth or through-the-thickness dimension, T, of weld 14, it is necessary that beam 24 scan that entire dimension of the weld. While this scan might be accomplished by varying the angle of incidence $\alpha_i$ and accordingly $\alpha_L$ of longitudinal wave 24, the preferred way of obtaining this scan is by maintaining $\alpha_i$ and $\alpha_L$ constant and moving the point or location of incidence of beam 22 with material surface 15 toward and away from weld seam 14 in a plane normal thereto as shown by arrows 28. This to and fro movement of beam 22 across the surface of plate 10 may be accomplished by moving transducer 20 as shown in FIGS. 2 and 3 or by having a plurality of transmitting transducers in tandem and aligned perpendicular to the length, L, of the weld seam and sequentially pulsing them as shown in FIG. 5.

A receiving transducer 30 is positioned to sense the redirected ultrasonic energy resulting when longitudinal beam 24 contacts a discontinuity 32. Receiving transducer 30 is in the plane of transmitting transducer 20 and beam 22. Transducer 30 is oriented to receive those ultrasonic waves 34, redirected by a discontinuity 32, which exit from weld 14 at surface 15 and substantially normal thereto. A sonic shield or beam collimator 36 is desirable if there is any significant spacing between receiving transducer 30 and surface 15 at weld 14. Such shield or collimator will typically be cylindrical and of a sound absorbant material such as rubber.

Shield 36 allows receiving transducer 30 to sense only that redirected energy 34 caused by discontinuities 32, but excludes any significant ultrasonic energy which results from beam 22 being reflected by the surface 15 of section 8. Reflection of beam 22, while not generally a problem, may become one when transmitting transducer 20 is quite near receiving transducer 30 and there is significant spacing between transducer 30 and weld 14. Shield 36 extends from receiving transducer 30 to within a short distance of the surface of weld 14, leaving only enough space to permit free movement of the inspection apparatus along the length of the weld seam. Electrical leads 38 and 40 are connected to appropriate pulsing and receiving electronics to be discussed in greater detail below.

Figure 3:
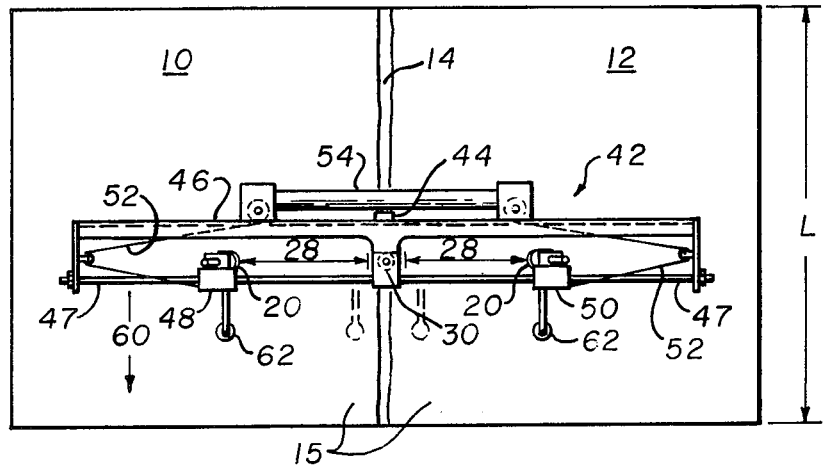
FIG. 3 is a plan or surface view of the material and weldment showing the preferred embodiment of the inspection apparatus.
Figure 2:
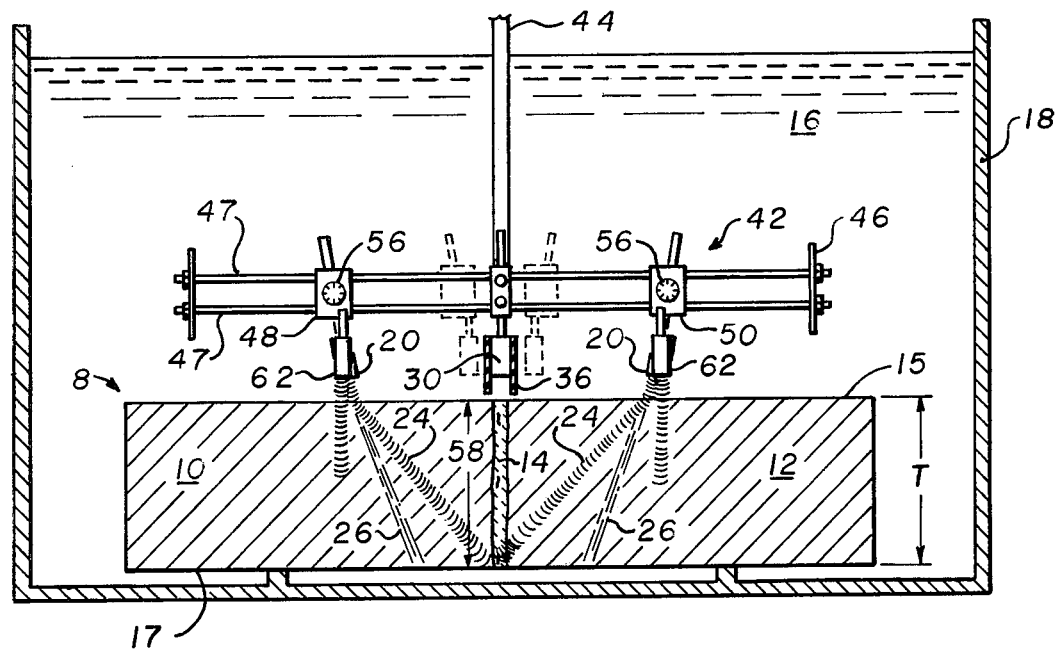
FIG. 2 is a through-the-thickness or elevational sectional view of the material and weldment showing a preferred embodiment of the inspection apparatus.

FIGS. 2 and 3 respectively show a through-the-thickness sectional view and a surface or plan view of the preferred embodiment of the invention. Ultrasonic inspection of weld seam 14 in plates 10 and 12 of section 8 is performed by a search assembly 42 which is comprised of a support arm 44 to which is affixed transducer guide assembly 46. A pair of parallel transducer guide arms 47 extend across and are supported by guide assembly 46. Receiving transducer 30 is fixedly mounted at the midpoint of transducer guide arms 47. A pair of transducer mounts 48 and 50 are supported by and slidable along guide arms 47, transducer mount 48 being on one side of transducer 30 and transducer mount 50 being on the other side of transducer 30. Transducer guide assembly 46 may, for examply, employ an Automation Industries Inc., Delta Technique Search Unit Manipulator. A drive cable 52 connects transducer mounts 48 and 50 with an actuator 54. Actuator 54 drives cable 52 to effect an oscillatory or shuttle motion of mounts 48 and 50 between the positions in FIG. 2 shown in solid and in phantom. Actuator 54 is preferably pneumatically operated for submergible use. Arrows 28 of FIG. 3 correspond with the like numbered arrow of FIG. 1 and indicate the direction of the to and fro motion of transducer mounts 48 and 50. A transmitting transducer 20 is supportingly engaged by each of transducer mounts 48 and 50. Transducer mounts 48 and 50 provide means for controlably adjusting the angle at which transducers 20 are mounted. A dial 56 on each of the transducer mounts indicates the angle at which transducers 20 are disposed. For inspection of weld seam 14 in steel plates 10 and 12 and wherein water 16 provides acoustical coupling, transducers 20 will each be directed toward weld seam 14 at an angle of about 10° with a line normal to surface 15. This arrangement results in a refracted longitudinal wave beam 24 which will obliquely intersect weld seam 14 at an angle of about 45° with a line normal to the surface and passing therethrough. The to and fro motion of transducers 20 occurs over a path which extends from immediately adjacent transducer 30 to an outer limit which will permit the refracted longitudinal wave beam from the transducer to reach the bottom of the weld seam. If longitudinal wave beam 24 intersects weld seam at an angle of 45°, it will be noted that the amplitude of the to and fro motion of transducers 20 is essentially the same as the thickness, T, of the section being measured when the depth of weld 14 is T. If, because of geometrical constraints, the oscillation amplitude of transducers 20 must be less than T, it is of course possible to reduce the angle at which the transducers are disposed and accordingly, the angle of longitudinal wave beam 24. The oscillatory motion of transducers 20 as indicated by arrows 28 results, as earlier indicated, in a through-the-thickness scan of weld 14 as indicated by arrows 58. The utilization of a transmitting transducer 20 on each side of weld seam 14 permits greater certainty in ascertaining the existence of a discontinuity 32 and in establishing its location through the width of the weld seam.

FIG. 3 shows weld seam 14 having a length, L, and in order to inspect the full length of the weld, it is necessary that longitudinal wave beam 24 scan not only the through-the-thickness dimension, T, but also the length, L. In order to scan the length of weld seam 14, search assembly 42 is advanced in a plane parallel to surface 15 of section 8 in the direction shown by arrow 60. The assembly may be either continuously advanced or may be advanced in incremental steps, ensuring that in the first instance the rate of advance and in the second instance the magnitude of each incremental step are small enough to obtain complete coverage of the weld seam by beam 24. Support arm 44 of search assembly 42 may be supported and driven by mechanisms not shown.

A preliminary inspection of the base material, plates 10 and 12, may be conducted by pulse echo longitudinal wave examination normal to surface 15 of the base metal. This inspection is accomplished with a pair of ultrasonic transducers 62. Each of the transducers 62 is oriented normal to the surface of the base material and transmits and receives longitudinal wave pulses in a manner known in the art. Transducers 62 are carried by transducer mounts 48 and 50 and are positioned several inches ahead of transducers 20 relative to the direction of travel 60 of search assembly 42. This positioning of sender-receiver transducers 62 in advance of weld inspection transducers 20 and 30 permits an examination of the base metal through which refracted longitudinal wave beam 24 must subsequently pass when inspecting weld 14. The probability that any defects or discontinuities in the base material will be oriented normal to surface 15 is low, thus permitting the use of normal beam longitudinal waves. The preliminary inspection need be performed only once and a record made of any defects encountered in the base material if subsequent stressing of section 8 is not expected to create any defects.

Figure 4:
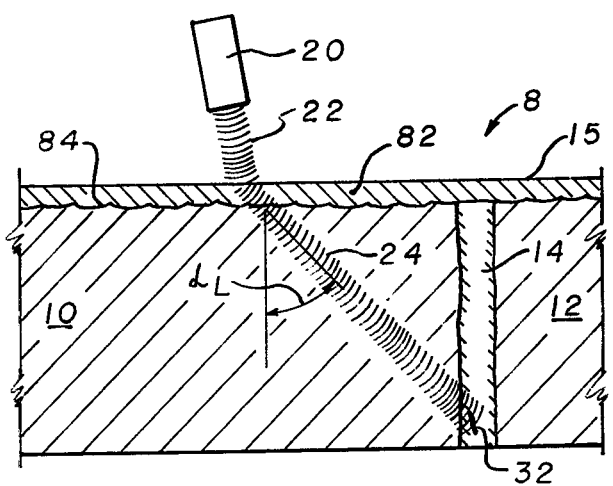
FIG. 4 is a through-the-thickness sectional view similar to that of FIG. 2 and showing a surface layer of weld deposit cladding on the base material having the weldment.

The crystal of receiving transducer 30 should be at least as wide as the width of weld seam 14 in order to detect any and all discontinuities in the weld seam in a single pass along its length. The crystal in each of the transmitting transducers 20 is preferably fairly wide for several reasons. Large diameter ultrasonic beams spread or diverge less than those of smaller diameter and are thus desirable for deep penetration inspections. Moreover, as seen in FIG. 4, a thin layer of weld deposit cladding 82 may overlie plates 10 and 12 of section 8 and form surface 15 thereof. Cladding 82 may be used to prevent corrosion. This cladding is generally thin, one-eighth to one-half inch, compared to the overall thickness of section 8. Even in instances in which the acoustical velocity of cladding 82 is different enough from that of plates 10 and 12 to result in significantly different angles of refraction of the beam, the point of entry of beam 24 into plate 10 or 12 is not appreciably shifted from the point of incidence with surface 15 because of the thinness of cladding 82. However, in the depositing of cladding 82 on plates 10 and 12, the fusion zone or interface 84 therebetween may have a rippled effect and the changing curvature of interface 84 may tend to vary the angle $\alpha_L$ of beam 24 relative to weld 14 as beam 22 moves across surface 15. When the diameter of beam 22 is greater than the spacing between adjacent rippled peaks, these effects tend to be averaged and stabilize $\alpha_L$ at one angle. Suitable crystals for transducers 20 and 30 would be 1½ inch diameter PZT Automation Industries crystals with a frequency of 1 MHz. The crystals of transducers 62 may be the same as those of transducers 20 and 30 or any other suitable transducer known in the art. In the embodiment of FIGS. 2 and 3 wherein a liquid couplant is employed, the spacing between the several transducers and surface 15 of section 8 may range from less than an inch to several inches. The transducer guide assembly structure as depicted in FIG. 2 provides linear motion of transducer mounts 48 and 50 in their oscillations. It should be noted, however, that if the weld seam under inspection extends axially of a cylindrical vessel, guide assembly 46 and transducer guide arms 47 may be arcuately curved to provide motion of transducers 20 and 62 parallel to the surface of the section.

FIG. 5 is a simplified schematic block diagram of the electrical components utilized to generate the ultrasonic pulses and to receive and display the information conveyed by the redirected energy for determining the presence and location of discontinuities in the weld zone being inspected. Electrical pulses are supplied to the transmitting transducers 20 and 62 by pulser/receiver 64 to generate the transmitted beams of ultrasonic pulses. Pulses of 1 MHz energy having a 4 microsecond duration are provided at a repetition rate of 1000 per second. This repetition rate is slow enough to permit receipt and analysis of the information resulting from one pulse before another is transmitted. This pulse timing permits each of transducers 62 to be used for both transmitting and receiving.

In performing the principal inspection of weld 14, both of the transmitting transducers 20 may be pulsed concurrently so that the zone of interest is saturated with ultrasonic energy from both sides of the weld to strengthen any redirected energy caused by a discontinuity. Alternatively, transducers 20 may be pulsed alternately and the received energy from each compared to determine the through-the-width positioning of a discontinuity in weld 14. Because each of the preliminary inspection transducers 62 serves as both a transmitting and receiving transducer, they might be pulsed concurrently or alternately. In the instance wherein several inspection paths are used concurrently and separate signal processing is required, separate signal channels must be used or a form of multiplexing provided. In order to accommodate the above mentioned limitations, pulser/receiver 64 may be of the multiplexing type.

FIG. 5 depicts two similar signal processing channels connected to the receiver portion of pulser/receiver 64. That channel having elements with the subscript "a" processes those signals which make up the principal inspection of weld 14 and that channel having elements with the subscript "b" processes those signals which make up the preliminary inspection. The receiving transducers convert the sensed ultrasonic energy to electrical signals which are then fed to the receiver for subsequent use in controlling output indication devices. The amplitude or strength of a pulse echo is affected by travel distance in a nonlinear and sometimes bi-directional manner because of near and far field effects. A conventional distance amplitude correction (DAC) unit 66 is used to compensate the signal for such effects. After correction by DAC unit 66 the signal is then available for controlling the output display of an oscilloscope 70 and may also be permanently retained by means of recorder 72. A gate monitor 68 is used, as for instance at the input to recorders 72a and 72b, to electrically pass only signals greater than a certain amplitude and/or occurring within a certain time span following each transmitted pulse in order to exclude unnecessary and confusing signals. The starting time and gate width of gate monitor 68 may be varied.

A position reference signal is provided for each ultrasonic pulse generated. This signal may be the electrical pulse used to drive the transmitting transducer though generally it is an electrical signal resulting from ultrasonic energy reflected to a transducer from a boundary of predetermined location, such as the front or back surface reflection. The position reference signal is used as a reference against which the signal representing ultrasonic energy redirected by a discontinuity is compared in measuring the pulse transit time determining the location of the discontinuity. The electrical signal employed to drive the transmitting transducers is also used to control the start of the horizontal sweep of the oscilloscopes. The information contained by the signals coming from the receiver of pulser/receiver 64 may be displayed in a variety of ways well known in the art, as for instance A scan, B scan, or C scan. For example if the display technique employed is of the type commonly referred to as an A scan, the time base of the horizontal scan and the gain of the vertical deflection, respectively of oscilloscopes 70a and 70b are adjusted and calibrated to indicate the distance through the thickness and the reference amplitude, respectively, against which discontinuities will be evaluated. This calibration may be performed using reference specimens having discontinuities in predetermined locations or it may be computed mathematically based on the signal from a boundary of the specimen under inspection, as the back reflection. Commercially available equipment such as the UM-721 Sperry Reflectorscope equipped with pulser/receiver, distance amplitude correction units and transigates meets the requirements of the above mentioned electrical components.

Figure 6:
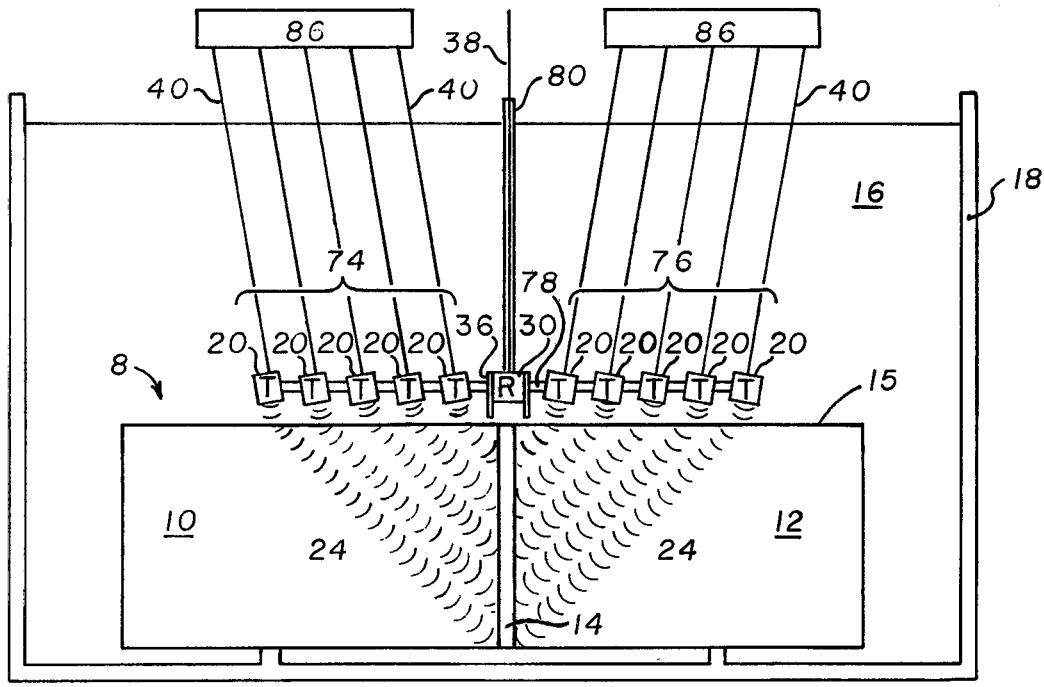
FIG. 6 is a through-the-thickness sectional view similar to that of FIG. 2 and showing an alternate embodiment of the inspection apparatus of the invention which electronically scans the weld.

FIG. 6 depicts an embodiment of the invention wherein the through-the-thickness scanning action of beams 22 and 24 is effected electronically rather than mechanically as in FIGS. 2 and 3. The signal transmitting transducers located on opposite sides of receiving transducer 30 and in a common plane as shown in FIGS. 2 and 3 are now replaced by arrays 74 and 76 of transducers 20. Each array is comprised of a plurality of parallel and closely spaced transmitting transducers 20. The transducers in each array being in alignment and within a plane common to both arrays and receiving transducer 30. The several transducers in an array are sufficiently close to one another to provide a substantially continuous beam pattern from one end of the array to the other. Each of the transmitting transducers 20 in an array is oriented at the same angle and in the same direction relative to surface 15 of section 8. As in the earlier water-steel example this angle will be about 9°–11° with the normal and directed toward receiving transducer 30, which, during operation, is positioned over weld 14. As with the mechanically oscillated embodiment of FIGS. 2 and 3, transducers 20 and 30 of FIG. 6 are all supported by and positioned on a mounting member 78 which is affixed to the end of support arm 80. Sonic shield 36 may be used to exclude undesirable reflections of ultrasonic energy from entering receiving transducer 30.

In operation, transducer 30 is positioned over weld seam 14 such that arrays 74 and 76 extend parallel to surface 15 of section 8 in a plane normal to the length, L, of the weld seam. The transmitting transducers 20 of an array are sequentially pulsed from one end of the array to the other by pulse switches 86. The pulsing of each subsequent transducer occurs a sufficient period of time after the preceeding one to permit receiving transducer 30 to receive any redirected energy resulting from only the preceeding pulse. The length, L, of weld seam 14 is inspected by moving support arm 80 in a direction paralleling the weld seam as in the earlier embodiments.

While we have illustrated and described a preferred embodiment of our invention, it is to be understood that such is merely illustrative and not restrictive and that variations and modifications may be made therein without departing from the spirit and scope of the invention. We, therefore, do not wish to be limited to the precise details set forth but desire to avail ourselves of such changes as fall within the purview of our invention.

What is claimed is:

1. The method of ultrasonically inspecting a zone of interest extending a depth of at least about four inches into a material from a surface thereof comprising the steps of:
    a. generating a beam of pulsed ultrasonic energy;
    b. directing said beam at a location on said surface of said material in an incident direction and oblique angle thereto which result in the propagation in said material of a refracted beam of ultrasonic energy in the longitudinal wave mode which is incident with and intersects a portion of said zone of interest at an oblique angle to a line normal to said surface and passing through the intersected portion of the zone of interest, said incident ultrasonic energy being redirected upon contacting a discontinuity in said intersected portion of the zone of interest; and
    c. detecting said redirected ultrasonic energy wich exits from said material substantially normal to said surface and within an area overlying said portion of the zone of interest intersected by said longitudinal wave beam, said detected ultrasonic energy being indicative of the presence of a discontinuity in said portion of the zone of interest intersected by said longitudinal wave beam.

2. The method of claim 1 wherein the ultrasonic energy of said transmitted beam is pulsed.

3. The method of claim 2 wherein said zone of interest is a weldment in said material.

4. The method of claim 3 wherein the steps of detecting said redirected ultrasonic energy comprise:
    a. sensing said redirected ultrasonic energy which exits from said material at said surface and substantially normal thereto within an area overlying that portion of the weldment intersected by said refracted beam;
    b. converting said sensed ultrasonic energy to electrical signals representative of said sensed ultrasonic energy; and
    c. providing an output indication responsive to said electrical signals representative of said sensed ultrasonic energy.

5. The method of claim 3 wherein said oblique angle at which said refracted beam intersects said weldment is between 40° and 50°.

6. The method of claim 3 wherein said portion of the weldment intersected by said refracted beam at any instant is less than the entire depth of said weldment in said material and said refracted beam is scanned across the entire depth of said weldment.

7. The method of claim 6 wherein said scanning of the weldment depth with said refracted beam comprises sequentially generating a plurality of beams of pulsed ultrasonic energy, each said beam being parallel the other and each said beam of said plurality being incident with said surface at a different location along a line extending from said weldment to an outer limit.

8. The method of claim 6 wherein said scanning of the weldment depth with said refracted beam comprises: moving said beam which is incident on said surface relative to said weldment such that the location of beam incidence with said surface moves along a line extending between said weldment and an outer limit and the direction and angle of incidence of said beam with said surface are maintained constant.

9. The method of claim 8 wherein said weldment is an elongated seam and said generated ultrasonic beam moves relative to said material is a direction parallel said elongated weld seam to scan the entirety of said weld seam.

10. The method of claim 8 wherein the step of detecting said redirected ultrasonic energy comprises:
    a. sensing said redirected ultrasonic energy which exits from said material at said surface and substantially normal thereto within an area overlying that portion of the weldment intersected by said refracted beam;
    b. converting said sensed ultrasonic energy to electrical signals representative of said sensed ultrasonic energy; and
    c. providing an output indication responsive to said electrical signals representative of said sensed ultrasonic energy.

11. The method of claim 10 including the steps of:
    a. providing an electrical position reference signal for each ultrasonic pulse generated, said reference signal indicating the presence of said pulse at a predetermined location; and
    b. comparing said electrical signals representative of said sensed ultrasonic energy with said position reference signal whereby the time lapse therebetween is indicative of the location of a discontinuity in said weldment.

12. The method of claim 11 further including the step of electrically gating said electrical signal representative of sensed ultrasonic energy to pass only signals occurring within a predetermined time span following the generation of each ultrasonic pulse.

13. In ultrasonic inspection apparatus for examining a zone of interest extending a depth of at least about 4 inches into a material from a surface thereof, the combination comprising:

a. transducer means for transmitting a beam of ultrasonic energy, said transducer means positioned and oriented to direct said beam at said surface of said material in a direction and at an oblique incident angle thereto which result in the propagation in said material of a refracted beam of ultrasonic energy in the longitudinal wave mode which is incident with and intersects said zone of interest at an oblique angle to a line normal to said surface and passing through said zone of interest, said incident ultrasonic energy being redirected upon contacting a discontinuity in said zone of interest;

b. means coupled to said transmitting transducer means for electrically stimulating said transmitting transducer means to provide said beam of ultrasonic energy;

c. ultrasonic transducer means positioned over said zone of interest intersected by said incident refracted beam for receiving any said redirected ultrasonic energy exiting therefrom substantially normal to said surface of the material thereat, said receiving transducer means providing an output signal responsive to said sensed ultrasonic energy; and d. read-out means coupled to said sensing transducer and responsive to said output signal corresponding with said received redirected energy for providing as indication of the presence of a discontinuity in said zone of interest.

14. The apparatus of claim 13 wherein said zone of interest is a weldment and said means for electrically stimulating said transmitting transducer means comprise a source of pulsed electrical energy and said transmitted beam is pulsed ultrasonic energy.

15. The apparatus of claim 14 wherein said transducer means for transmitting said ultrasonic beam comprise:

a. a plurality of closely spaced parallelly oriented ultrasonic transducers extending in alignment from said receiving transducer to an outer limit and being equidistant from said surface; and b. said means for electrically pulsing said transmitting transducer means is operative to pulse each said transducer of said plurality in sequence.

16. The apparatus of claim 14 wherein said transmitting and said receiving transducer means are spaced from said surface of said material, a liquid acoustical coupling medium extends between said transducers and said surface, and collimating means extend from said receiving transducer substantially to said surface for restricting the ultrasonic energy admitted to said receiving transducer to that which exits from said surface substantially normal thereto within the cross sectional area of said collimating means.

17. The apparatus of claim 16 wherein said acoustical coupling medium is water, said material is steel and said transmitting transducer means are oriented at an angle of less that 14° from the normal to said surface of said material.

18. The apparatus of claim 14 wherein said transmitting transducer means are plural and even in number, one-half of said number positioned to one side of said receiving transducer means and the other half of said number positioned to the other side of said receiving transducer means and said transmitting and receiving transducer means all being in a common plane.

19. The apparatus of claim 14 including means for moving said transmitting transducer means relative to said receiving transducer means in a path parallel said surface and extending from adjacent said receiving transducer to an outer limit whereby said refracted beam of longitudinal waves is scanned across said weldment in a direction normal to said surface.

20. The apparatus of claim 19 wherein said transmitting transducer means are plural and even in number, oone-half of said number positioned to one side of said receiving transducer means and the other half of said number positioned to the other side of said receiving transducer means and said transmitting and receiving transducer means all being in a common plane.

21. The apparatus of claim 20 wherein said weldment is an elongated seam and said transmitting transducer means are movable relative to said receiving transducer means in a direction perpendicular to said elongated weld seam.

22. The apparatus of claim 21 including means for providing relative motion between said material and said transmitting and receiving transducer means in a direction parallel the elongated extend of said weld seam to scan the entirety of said weld seam.

23. The apparatus of claim 22 including normal beam, ultrasonic pulse echo inspection means, positioned ahead of said transmitting transducer means in said direction of motion parallel said weld seam and movable therewith for preliminarily inspecting that portion of said material adjacent said weldment prior to propagation therethrough of said refracted longitudinal wave beam.

24. The method of claim 1 wherein said beam of pulsed energy is directed at said surface in an incident direction and oblique angle thereto resulting in said refracted beam in said longitudinal wave mode intersecting said zone of interest before contacting the back surface of said material.

25. The method of claim 24 wherein the depth of said zone of interest in said material exceeds 6 inches.

* * * * *